United States Patent
Fochtman et al.

(10) Patent No.: US 7,617,605 B2
(45) Date of Patent: Nov. 17, 2009

(54) COMPONENT GEOMETRY AND METHOD FOR BLOWOUT RESISTANT WELDS

(75) Inventors: James Paul Fochtman, Williamsburg, VA (US); Jack David Oliver, Hayes, VA (US)

(73) Assignee: Continental Automotive Systems US, Inc., Auburn Hills, MI (US)

(*) Notice: Subject to any disclaimer, the term of this patent is extended or adjusted under 35 U.S.C. 154(b) by 394 days.

(21) Appl. No.: 11/453,543

(22) Filed: Jun. 15, 2006

(65) Prior Publication Data

US 2008/0264389 A1 Oct. 30, 2008

Related U.S. Application Data

(60) Provisional application No. 60/691,215, filed on Jun. 16, 2005.

(51) Int. Cl.
- B21D 21/00 (2006.01)
- B21D 39/00 (2006.01)
- B21K 1/22 (2006.01)
- B23P 17/00 (2006.01)
- B23K 26/00 (2006.01)
- F02M 61/14 (2006.01)

(52) U.S. Cl. ............ 29/890.131; 29/888.4; 29/890.126; 29/890.129; 123/470; 228/141.1; 228/153; 228/154; 228/161; 228/165; 219/121.63; 219/121.64; 219/121.86

(58) Field of Classification Search .............. 29/888.01, 29/888.4, 88.45, 890.126, 890.129, 890.131; 123/470; 219/105, 107, 121.63, 121.64, 219/121.68; 228/141.1, 155, 161, 165, 135
See application file for complete search history.

(56) References Cited

U.S. PATENT DOCUMENTS

| | | | |
|---|---|---|---|
| 4,386,728 A | 6/1983 | Torok et al. | |
| 4,682,002 A | 7/1987 | Delle Piane et al. | |
| 4,879,449 A | 11/1989 | Duley et al. | |
| 4,916,284 A | 4/1990 | Petrick | |
| 5,272,309 A | 12/1993 | Goruganthu et al. | |
| 5,591,359 A | 1/1997 | Saitou et al. | |
| 6,060,682 A | 5/2000 | Westbroek et al. | |
| 6,191,379 B1 | 2/2001 | Offer et al. | |
| 6,253,989 B1* | 7/2001 | Bennett ................ 228/135 |
| 6,444,946 B1 | 9/2002 | Korte | |
| 6,687,997 B2* | 2/2004 | Dallmeyer et al. ..... 29/890.128 |
| 6,717,099 B2 | 4/2004 | Arya | |
| 7,385,156 B2* | 6/2008 | Nozue et al. ................ 219/107 |
| 2002/0038793 A1 | 4/2002 | Yamada | |
| 2002/0047054 A1 | 4/2002 | Dallmeyer et al. | |

(Continued)

FOREIGN PATENT DOCUMENTS

DE 102004013413 A1 4/2005

(Continued)

*Primary Examiner*—David P Bryant
*Assistant Examiner*—Alexander P Taousakis

(57) ABSTRACT

In a method for reducing "blow-out" of annular welds for attaching components in a fuel injector, a relief region is formed on radially-facing surfaces of the components. The relief region is adjacent to a press-fit region. The components are then pressed together, and a weld is made in the relief region. A sealed gap is thereby formed in the relief region between the weld and the press-fit region. The sealed gap provides for the expansion of trapped gases that could otherwise "blow out" the liquid weld bead.

15 Claims, 3 Drawing Sheets

U.S. PATENT DOCUMENTS

| | | |
|---|---|---|
| 2003/0016777 A1 | 1/2003 | Vandergheynst et al. |
| 2005/0056712 A1 | 3/2005 | Fukutomi |
| 2008/0156298 A1 * | 7/2008 | Brauneis et al. ............. 123/470 |

FOREIGN PATENT DOCUMENTS

| | | |
|---|---|---|
| EP | 0916443 A | 5/1999 |
| EP | 1236535 A2 | 4/2002 |
| GB | 2261620 A | 5/1993 |
| JP | 57072787 | 5/1982 |
| JP | 60121093 | 6/1985 |
| JP | 1233084 | 8/1989 |
| JP | 02268990 A | 2/1990 |
| JP | 3052789 | 3/1991 |
| JP | 2004263841 | 9/2004 |

* cited by examiner

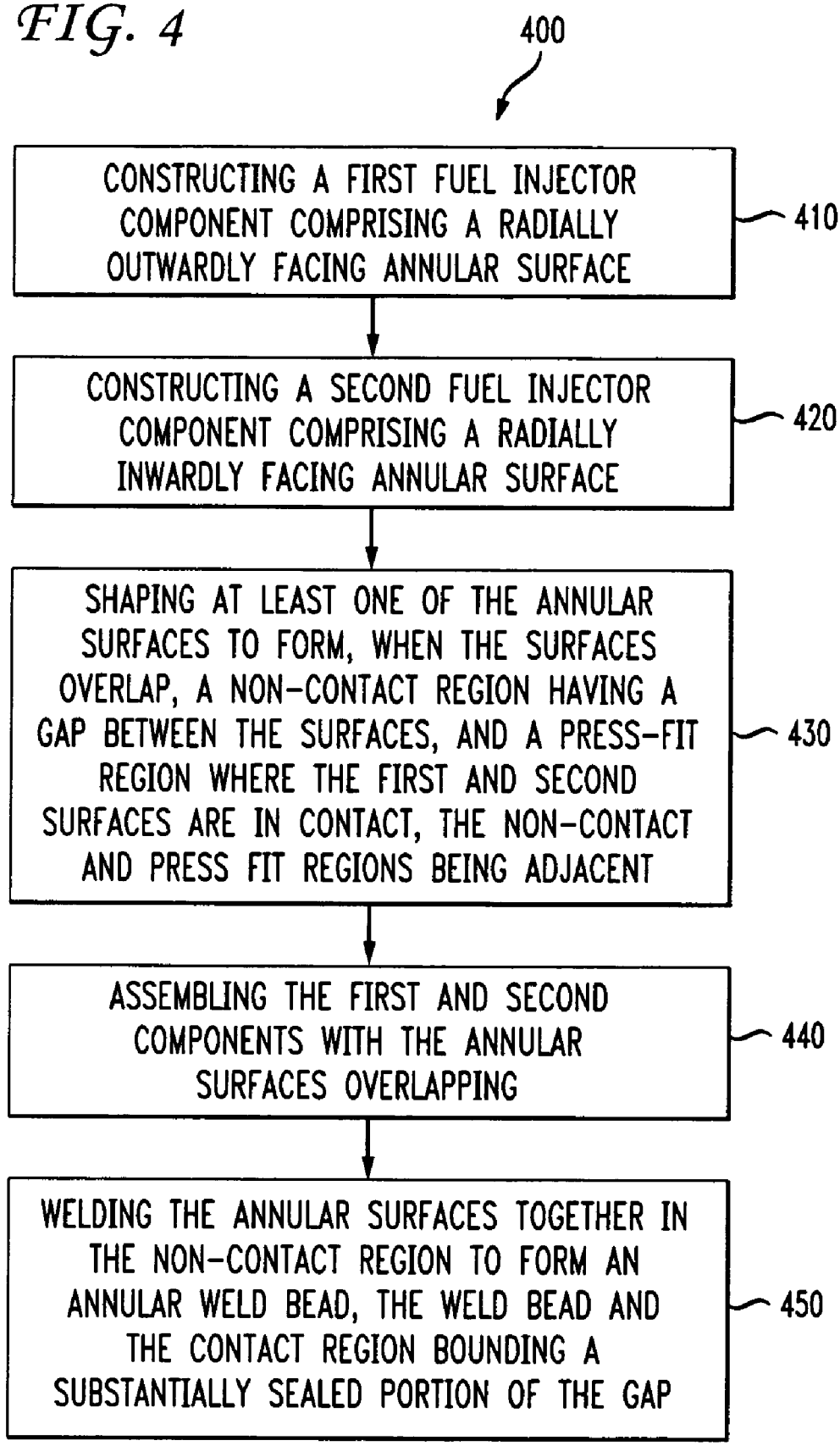

COMPONENT GEOMETRY AND METHOD FOR BLOWOUT RESISTANT WELDS

CROSS REFERENCE TO RELATED APPLICATIONS

This application claims the benefit of U.S. Provisional Application Ser. No. 60/691,215 entitled "Blowout Resistant Weld Geometry for Laser Welds," filed on Jun. 16, 2005, the contents of which are hereby incorporated by reference herein in their entirety.

This application is further related to U.S. patent application Ser. No. 11/453,628, entitled "Blowout Resistant Weld Method for Laser Welds for Press-Fit Parts," filed on the same date as the present application.

FIELD OF THE INVENTION

The present invention relates generally to the field of welding, and more particularly, to techniques and systems for forming hermetic, blow-out resistant welds between press-fitted components in a fuel injector assembly.

BACKGROUND OF THE INVENTION

A fuel injector includes a pressure vessel, a valve venting the pressure vessel, and a coil-driven magnetic circuit for driving the valve. The pressure vessel must not exhibit external fuel leaks during operation. Most fuel injector designs utilize multiple components that are welded together to create the pressure vessel.

Typically, fuel injector pressure vessel components are welded using a laser. A laser has been used successfully to weld joint configurations such as lap joints where overlapping surfaces of the components are jointed, butt joints where two components are joined end-to-end without overlap, and fillet joints in which material is removed on abutting parts to provide room for a weld bead. Lasers are suitable for welding small precision components together dependably and quickly in a production environment.

In many applications, the laser beam is held stationary as the part to be welded is moved or rotated to form the weld. To weld the hermetic pressure vessel used in fuel injectors, the beam is commonly held stationary while the part is rotated. For a hermetic weld of that type on tubular components such as those of the fuel injector pressure vessel, the "on" time for the laser beam is greater than the time it takes the part to make one revolution. The resulting overlap of the weld ensures that the weld is hermetic.

One common problem associated with such laser welding on tubular components occurs as the overlap of the weld is formed. Certain welding conditions and joint designs tend to result in a "blow out" of the weld bead, usually during final overlap of the weld. That "blow out" is created by rapidly increasing internal pressure on one side of the weld, due to a sudden rise in temperature related to the welding. The "blow out" occurs most commonly as the weld overlap occurs, although under certain conditions it is known to occur elsewhere. If an internal region to either side of the weld joint is undergoing a sufficient pressure increase, the weld "blow out" occurs when the molten weld pool is unable to resist the forces exerted by the pressure differential. The weld "blows out," leaving a hole or gap in the weld bead. That hole typically leads to an increase in leak-related scrap during the assembly process.

For example, two components may be lap welded together at a continuous "interference fit" or press-fit region. Such welds have been known to exhibit "blow-out" regions at random locations relative as well as in the overlap. Those "blow-outs" are often at multiple radial locations throughout the weld. It has been theorized that in a press fit region, small cavities contain trapped air due to an imperfect surface finish of the components pressed together. When laser welding is attempted over those small cavities, the air inside undergoes a sudden change in temperature and expands. That expansion "blows out" the molten weld pool, leaving behind a void in the weld.

Alternatively, the two parts may be joined without a press fit and with clearance between the facing surfaces. No differential pressure is created, and therefore there are virtually no "blow-outs." That joint design, however, has two significant drawbacks when used in a fuel injector application. First, any weld slag or oxides created by the welding process can escape from the weld joint into the valve body, creating internal contamination of the fuel injector. Such internal contamination in a precision device such as a fuel injector can have undesirable effects. Secondly, many designs require a press fit between the two components for processing reasons.

There is therefore presently a need to provide a method and system for reliably creating a hermetic weld joining tubular components of a fuel injector. To the inventors' knowledge, no such technique is currently available.

SUMMARY OF THE INVENTION

One embodiment of the present invention is a method for forming a fuel injector having a fuel inlet, and fuel outlet and a fuel passageway extending from the fuel inlet to the fuel outlet along a longitudinal axis. The method includes the steps of constructing a first fuel injector component comprising a radially outwardly facing annular surface; constructing a second fuel injector component comprising a radially inwardly facing annular surface; shaping at least one of the annular surfaces to form, when the surfaces overlap, a non-contact region having a gap between the surfaces, and a press-fit region where the first and second surfaces are in contact, the non-contact and press fit regions being adjacent; assembling the first and second components by overlapping the annular surfaces; and welding the annular surfaces together in the non-contact region to form an annular weld bead, the weld bead and the contact region bounding a substantially sealed portion of the gap.

The surfaces in the non-contact region may be between 0.005 and 0.025 mm apart. A center of the weld bead may be at least 1 mm from the contact region.

The first fuel injector component may be a pole piece, while the second fuel injector component may be a non-magnetic shell.

The step of welding the annular surfaces together may be a laser welding operation. The laser welding operation may include the steps of rotating the assembled first and second components about a longitudinal axis, and applying a laser welding beam. More particularly, the laser welding operation may include rotating the assembled first and second components at 200 RPM; and applying a laser welding beam for 285 milliseconds at 850 Watts, then applying the laser welding beam for 45 milliseconds at 820 Watts.

The shaping step may form the non-contact region on a longitudinal side of the press-fit region opposite a valve body of the fuel injector.

Another embodiment of the invention is a fuel injector having a fuel inlet, and fuel outlet and a fuel passageway extending from the fuel inlet to the fuel outlet along a longitudinal axis. The fuel injector further comprises a first fuel injector component comprising a first component inlet, outlet, and passageway, the first component passageway extending from the first component inlet to the first component outlet along the longitudinal axis, the first component further comprising a radially outwardly facing exterior surface; a second fuel injector component comprising a second component inlet, outlet, and passageway, the second component passageway extending from the secon component inlet to the second component outlet along the longitudinal axis, the second component further comprising a radially inwardly facing interior surface; the exterior surface of the first component facing the interior surface of the second component; an annular weld bead connecting the interior and exterior surfaces; and an annular press-fit region offset from the annular weld bead in a longitudinal direction, the interior and exterior surfaces being in contact in the press-fit region; the annular weld bead and the annular press fit region delineating a sealed annular clearance region wherein the interior and exterior surfaces are spaced apart.

The annular clearance region of the fuel injector may have a ratio of length to width greater than 10. The interior and exterior surfaces may be spaced apart in the annular clearance region between 0.005 and 0.025 mm. A center of the weld bead may be at least 1 mm from the press-fit region. The first fuel injector component may be a pole piece and the second fuel injector component may be a non-magnetic shell.

The annular weld bead may be a laser weld bead. The fuel injector may further comprise a fuel injector valve body, the non-contact region being on a longitudinal side of the press-fit region opposite the valve body.

In yet another embodiment of the invention, a method is provided for assembling a pole piece and a non-magnetic shell of a fuel injector, the pole piece comprising a radially outwardly facing annular surface and the non-magnetic shell comprising a radially inwardly facing annular surface. The method includes the steps of forming an annular relief region on at least one of the annular surfaces; assembling the non-magnetic shell and the pole piece with the annular surfaces overlapping; the first and second surfaces being in contact in a press-fit region, and the first and second surfaces defining a gap therebetween at the relief region; welding an annular weld bead in the relief region, the weld bead joining the annular surfaces, the weld bead and the press-fit region bounding a substantially sealed portion of the gap.

BRIEF DESCRIPTION OF THE DRAWINGS

FIG. 4 is a flow chart depicting a method according to one embodiment of the invention.

DESCRIPTION OF THE INVENTION

Figure 1:
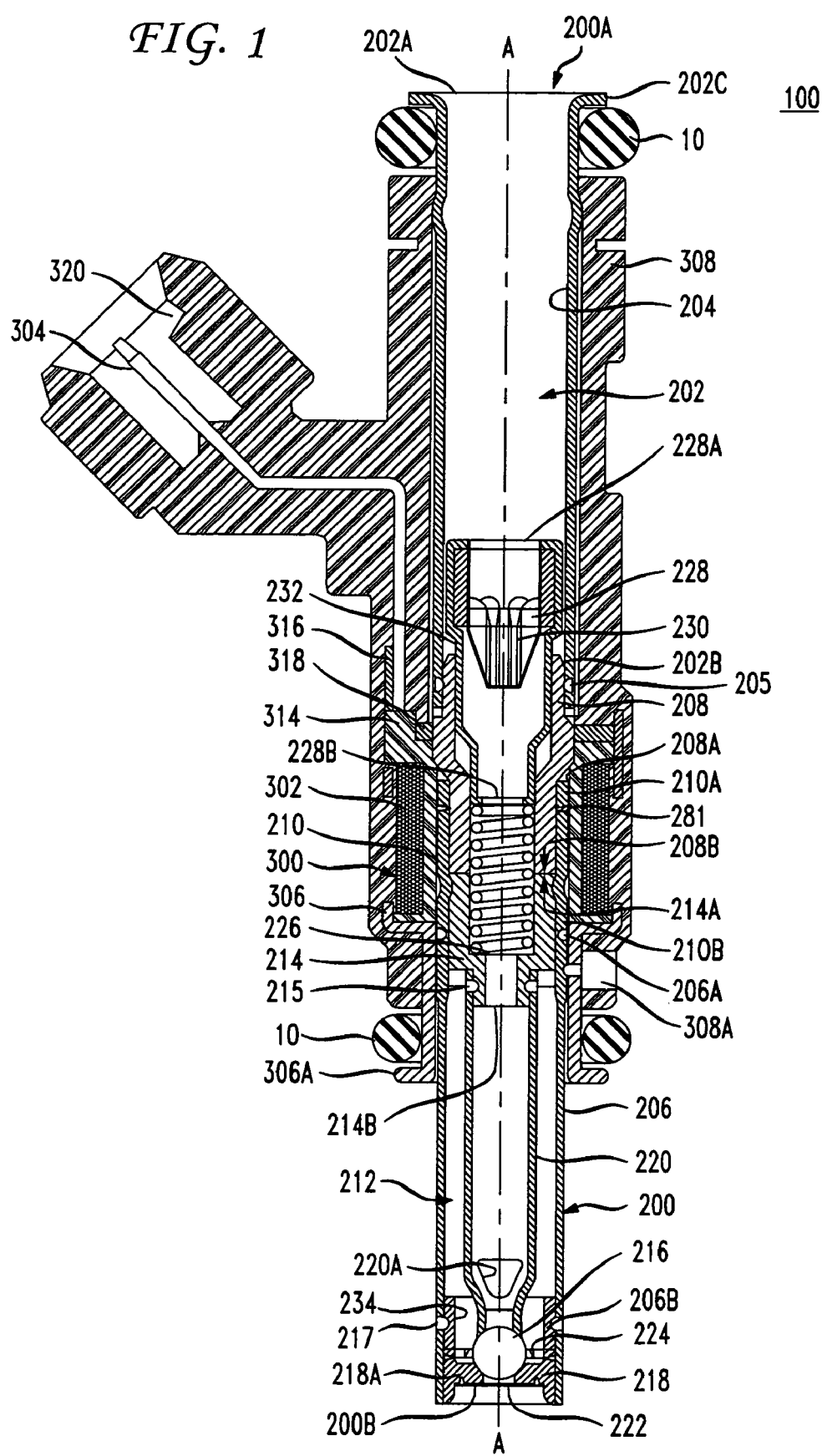
FIG. 1 is a sectional view of a fuel injector according to one embodiment of the invention.

The inventors have developed a technique and a fuel injector design to address the above-described problems in welding fuel injector pressure vessels. A cross-sectional view of a fuel injector 100 according to one embodiment of the invention is shown in FIG. 1. While the invention is described in connection with that exemplary fuel injector, one skilled in the art will understand that the inventive method and apparatus are applicable to other fuel injector designs. Embodiments of the invention may further be used in other welding applications where weld "blow out" is a concern.

Referring to FIG. 1, a solenoid actuated fuel injector 100 dispenses a quantity of fuel that is to be combusted in an internal combustion engine (not shown). The fuel injector 100 extends along a longitudinal axis A-A between a first injector end 200A and a second injector end 200B, and includes a valve group subassembly 200 and a power group subassembly 300. The valve group subassembly 200 performs fluid handling functions, e.g., defining a fuel flow path and prohibiting fuel flow through the injector 100. The power group subassembly 300 performs electrical functions, e.g., converting electrical signals to a driving force for permitting fuel flow through the injector 100.

The valve group subassembly 200 includes a tube assembly 202 extending along the longitudinal axis A-A between the first fuel injector end 200A and the second fuel injector end 200B. The tube assembly 202 can include at least an inlet tube 204, a non-magnetic shell 210, and a valve body 206. The inlet tube 204 has a first inlet tube end 202A proximate to the first fuel injector end 200A. The inlet tube 204 can be flared at the inlet end 202A into a flange 202C to retain an O-ring 10. A second inlet tube end 202B of the inlet tube 204 is connected to a first shell end 210A of the non-magnetic shell 210. A second shell end 210B of the non-magnetic shell 210 can be connected to a generally transverse planar surface of a first valve body end 206A of the valve body 206. A second valve body end 206B of the valve body 206 is disposed proximate to the second tube assembly end 200B. The inlet tube 204 can be formed by a deep drawing process or by a rolling operation. A separate pole piece 208 can be connected to the inlet tube 204 and connected to the first shell end 210A of the non-magnetic shell 210. The pole piece may comprise a stainless steel material such as SS 430FR (ASTM A838-00). The non-magnetic shell 210 can comprise non-magnetic stainless steel, e.g., 300-series stainless steels such as SS 305 (EN 10088-2), or other materials that have similar structural and magnetic properties.

As shown in FIG. 1, inlet tube 204 is attached to pole piece 208 by means of welds 205. Formed into the outer surface of pole piece 208 are pole piece shoulders 208A, which, in conjunction with mating shoulders of a bobbin of the coil subassembly, act as positive mounting stops when the two subassemblies are assembled together. The length of pole piece 208 is fixed whereas the length of the inlet tube 204 can vary according to operating requirements of the particular fuel injector design. By forming inlet tube 204 separately from pole piece 208, different length injectors can be manufactured by using different inlet tube lengths during the assembly process. The inlet tube 204 can be attached to the pole piece 208 at an inner circumferential surface of the pole piece 208. Alternatively, an integral inlet tube and pole piece can be attached to the inner circumferential surface of a non-magnetic shell 210.

An armature assembly 212 is disposed in the tube assembly 202. The armature assembly 212 includes a first armature assembly end having a ferro-magnetic or armature portion 214 and a second armature assembly end having a sealing portion. The armature assembly 212 is disposed in the tube assembly 202 such that a shoulder 214A of the armature 214 confronts a shoulder 208B of the pole piece 208. The sealing portion can include a closure member 216, e.g., a spherical valve element, that is moveable with respect to the seat 218 and its sealing surface 218A. The closure member 216 is movable between a closed configuration, as shown in FIG. 1, and an open configuration (not shown). In the closed configuration, the closure member 216 contiguously engages the sealing surface 218A to prevent fluid flow through the opening. In the open configuration, the closure member 216 is spaced from the seat 218 to permit fluid flow through the opening. The armature assembly 212 may also include a separate intermediate portion 220 connecting the ferro-magnetic or armature portion 214 to the closure member 216. The intermediate portion or armature tube 220 may be attached to the armature 214 and closure member 216 by weld beads 215, 217, respectively.

Surface treatments can be applied to at least one of the end portions 208B and 214A to improve the armature's response, reduce wear on the impact surfaces and variations in the working air gap between the respective end portions 208B and 214A. The surface treatments can include coating, plating or case-hardening. Coatings or platings can include, but are not limited to, hard chromium plating, nickel plating or keronite coating. Case hardening on the other hand, can include, but is not limited to, nitriding, carburizing, carbo-nitriding, cyaniding, heat, flame, spark or induction hardening.

Fuel flow through the armature assembly 212 can be provided by at least one axially extending through-bore 214B and at least one apertures 220A through a wall of the armature assembly 212. The apertures 220A, which can be of any shape, are preferably non-circular, e.g., axially elongated, to facilitate the passage of gas bubbles. The apertures 220A provide fluid communication between the at least one through-bore 214B and the interior of the valve body 206. Thus, in the open configuration, fiel can be communicated from the through-bore 214B, through the apertures 220A and the interior of the valve body 206, around the closure member 216, and through metering orifice openings of an orifice disk 222 into the engine (not shown).

As a further alternative, a two-piece armature having an armature portion directly connected to a closure member can be utilized. Although both the three-piece and the two-piece armature assemblies are interchangeable, the three-piece armature assembly is preferable due to its ability to reduce magnetic flux leakage from the magnetic circuit of the fuel injector 100 according to the present invention. It should be noted that the armature tube 220 of the three-piece armature assembly can be fabricated by various techniques, for example, a plate can be rolled and its seams welded or a blank can be deep-drawn to form a seamless tube.

The seat 218 is secured at the second end of the tube assembly 202. An orifice disk 222 can be used in connection with the seat 218 to provide at least one precisely sized and oriented orifice in order to obtain a particular fuel spray pattern and targeting. The precisely sized and oriented orifice can be disposed on the center axis of the orifice disk 222 or, preferably disposed off-axis, and oriented in any desirable angular configuration relative to one or more reference points on the fuel injector 100. It should be noted here that both the valve seat 218 and orifice disk 222 are fixedly attached to the valve body 206 by known conventional attachment techniques, including, for example, laser welding, crimping, and friction welding or conventional welding. The orifice disk 222 is preferably tack welded to the seat 218 in a fixed spatial orientation to provide the particular fuel spray pattern and targeting of the fuel spray.

In the case of a spherical valve element providing the closure member 216, the spherical valve element can be connected to the armature assembly 212 at a diameter that is less than the diameter of the spherical valve element. Such a connection would be on side of the spherical valve element that is opposite contiguous contact with the seat 218. A lower armature assembly guide 224 can be disposed in the tube assembly 202, proximate the seat 218, and would slidingly engage the diameter of the spherical valve element. The lower armature assembly guide 224 can facilitate alignment of the armature assembly 212 along the longitudinal axis A-A.

A resilient member 226 is disposed in the tube assembly 202 and biases the armature assembly 212 toward the seat 218. A filter assembly 228 comprising a filter 230 and a preload adjuster 232 is also disposed in the tube assembly 202. The filter assembly 228 includes a first filter assembly end 228A and a second filter assembly end 228B. The filter 230 is disposed at one end of the filter assembly 228 and also located proximate to the first end 200A of the tube assembly 202 and apart from the resilient member 226 while the preload adjuster 232 is disposed generally proximate to the second end of the tube assembly 202. The preload adjuster 232 engages the resilient member 226 and adjusts the biasing force of the member 226 with respect to the tube assembly 202. In particular, the preload adjuster 232 provides a reaction member against which the resilient member 226 reacts in order to close the injector valve 100 when the power group subassembly 300 is de-energized. The position of the preload adjuster 232 can be retained with respect to the inlet tube 204 by an interference press-fit between an outer surface of the preload adjuster 232 and an inner surface of the tube assembly 202. Thus, the position of the preload adjuster 232 with respect to the inlet tube 204 can be used to set a predetermined dynamic characteristic of the armature assembly 212.

The valve group subassembly 200 can be assembled as follows. The non-magnetic shell 210 is connected to the inlet tube 204 via the pole piece 208, and to the valve body 206. The non-magnetic shell 210 and pole piece 208 are joined by the weld bead 281. Assembly of the non-magnetic shell may be performed using laser welding techniques as described in more detail below with reference to FIGS. 2-4.

The filter assembly 228 is inserted along the axis A-A from the first end 200A of the tube assembly 202. Next, the resilient member 226 and the armature assembly 212 (which was previously assembled) are inserted along the axis A-A from the injector outlet end 200B of the valve body 206. The adjusting tube 232, the filter assembly 228 can be inserted into the inlet tube 204 to a predetermined distance so as to permit the adjusting tube 232 to preload the resilient member 226. Positioning of the filter assembly 228, and hence the adjusting tube 232 with respect to the inlet tube 204 can be used to adjust the dynamic properties of the resilient member 226, e.g., so as to ensure that the armature assembly 212 does not float or bounce during injection pulses. The seat 218 and orifice disk 222 are then inserted along the axis A-A from the second valve body end 206B of the valve body 206. The seat 218 and orifice disk 222 can be fixedly attached to one another or to the valve body 206 by known attachment techniques such as laser welding, crimping, friction welding, conventional welding, etc. Other preferred variations of the valve group subassembly 200 are described and illustrated in U.S. Patent Publication No. 20020047054 published on Apr. 25, 2002, which is hereby incorporated by reference in its entirety.

The power group subassembly 300 comprises an electromagnetic coil 302, at least one terminal 304, a coil housing 306, and an overmold 308. The electromagnetic coil 302 comprises a wire that that can be wound on a bobbin 314 and electrically connected to electrical contacts 316 on the bobbin 314. When energized, the coil 302 generates magnetic flux that moves the armature assembly 212 toward the open configuration, thereby allowing the fuel to flow through the opening. De-energizing the electromagnetic coil 302 allows the resilient member 226 to return the armature assembly 212 to the closed configuration, thereby shutting off the fuel flow. The housing, which provides a return path for the magnetic flux, generally includes a ferro-magnetic cylinder surrounding the electromagnetic coil 302 and a flux washer 318 extending from the cylinder toward the axis A-A. The flux washer 318 can be integrally formed with or separately attached to the cylinder. The coil housing 306 can include holes, slots, or other features to break-up eddy currents that can occur when the coil 302 is energized.

The overmold 308 maintains the relative orientation and position of the electromagnetic coil 302, the at least one terminal 304, and the coil housing 306. The overmold 308 includes an electrical harness connector 320 portion in which a portion of the terminal 304 is exposed. The terminal 304 and the electrical harness connector 320 portion can engage a mating connector, e.g., part of a vehicle wiring harness (not shown), to facilitate connecting the injector 100 to an electrical power supply (not shown) for energizing the electromagnetic coil 302.

According to a preferred embodiment, the magnetic flux generated by the electromagnetic coil 302 flows in a circuit that includes the pole piece 208, the armature assembly 212, the valve body 206, the coil housing 306, and the flux washer 318. The magnetic flux moves across a parasitic airgap between the homogeneous material of the magnetic portion or armature 214 and the valve body 206 into the armature assembly 212 and across a working air gap between end portions 208B and 214A towards the pole piece 208, thereby lifting the closure member 216 away from the seat 218.

To set the lift, i.e., ensure the proper injector lift distance, several techniques may be utilized. According to a preferred technique, a lift sleeve 234 is displaced axially within the valve body 206. The position of the lift sleeve 234 is adjusted by moving the lift sleeve 234 axially. The lift distance is measured with a test probe (not shown). Once the desired lift is reached, the sleeve is welded to the valve body 206, e.g., by laser welding. The valve body 206 is then attached to the inlet tube 204 assembly by a weld, preferably a laser weld. The assembled fuel group subassembly 200 is then tested, e.g., for leakage.

The preparation of the power group sub-assembly 300, which may include (a) the coil housing 306, (b) the bobbin assembly including the terminals 304, (c) the flux washer 318, and (d) the overmold 308, can be performed separately from the fuel group subassembly.

According to a preferred embodiment, wire is wound onto a pre-formed bobbin 314 having electrical connector portions 316 to form a bobbin assembly. The bobbin assembly is inserted into a pre-formed coil housing 306. To provide a return path for the magnetic flux between the pole piece 208 and the coil housing 306, flux washer 318 is mounted on the bobbin assembly. A pre-bent terminal 304 having axially extending connector portions are coupled to the electrical contact portions 316 of the coil and brazed, soldered welded, or, preferably, resistance welded. The partially assembled power group assembly is now placed into a mold (not shown). By virtue of its pre-bent shape, the terminals 304 will be positioned in the proper orientation with the harness connector 320 when a polymer is poured or injected into the mold. Alternatively, two separate molds (not shown) can be used to form a two-piece overmold as described earlier. Additionally, a portion of the coil housing 306 can extend axially beyond an end of the overmold 308 to allow the injector to accommodate different length injector tips. The extended portion may be formed with a flange 306A to retain a sealing member such as the O-ring 10.

The assembled power group subassembly 300 can be mounted on a test stand to determine the solenoid's pull force, coil resistance and the drop in voltage as the solenoid is saturated during energization of the coil.

The inserting of the fuel group subassembly 200 into the power group subassembly 300 operation can involve setting the relative rotational orientation of fuel group subassembly 200 with respect to the power group subassembly 300. According to the preferred embodiments, the fuel group and the power group subassemblies can be rotated such that the included angle between the reference point(s) on the orifice disk 222 (including opening(s) thereon) and a reference point on the injector harness connector 320 are within a predetermined angle. The relative orientation can be set using robotic cameras or computerized imaging devices to look at respective predetermined reference points on the subassemblies, calculate the angular rotation necessary for alignment, orient the subassemblies and then check with another look and so on until the subassemblies are properly oriented. Once the desired orientation is achieved, the subassemblies are inserted together. The inserting operation can be accomplished by one of two methods: "top-down" or "bottom-up." According to the former, the power group subassembly 300 is slid downward from the top of the fuel group subassembly 200, and according to the latter, the power group subassembly 300 is slid upward from the bottom of the fuel group subassembly 200. In situations where the inlet tube 204 assembly includes a flared first end, bottom-up method is required. Also in those situations, the O-ring 10 that is retained by the flared first end can be positioned around the power group subassembly 300 prior to sliding the fuel group subassembly 200 into the power group subassembly 300. After inserting the fuel group subassembly 200 into the power group subassembly 300, those two subassemblies are affixed together, e.g., by welding, such as laser welding. According to a preferred embodiment, the overmold 308 includes an opening 308A that exposes a portion of the coil housing 306. This opening 308A provides access for a welding implement to weld the coil housing 306 with respect to the valve body 206. Of course, other methods or affixing the subassemblies with respect to one another can be used. Finally, the O-ring 10 at either end of the fuel injector can be installed.

In operation, the electromagnetic coil 302 is energized, thereby generating magnetic flux in the magnetic circuit. The magnetic flux moves armature assembly 212 (along the axis A-A, according to a preferred embodiment) towards the integral pole piece 208, closing the working air gap. That movement of the armature assembly 212 separates the closure member 216 from the seat 218 and allows fuel to flow from the fuel rail (not shown), through the inlet tube 204, the through-bore 214B, the apertures 220A and the valve body 206, between the seat 218 and the closure member 216, through the opening, and finally through the orifice disk 222 into the internal combustion engine (not shown). When the electromagnetic coil 302 is de-energized, the armature assembly 212 is moved by the bias of the resilient member 226 to contiguously engage the closure member 216 with the seat 218, and thereby prevent fuel flow through the injector 100.

Figure 2:
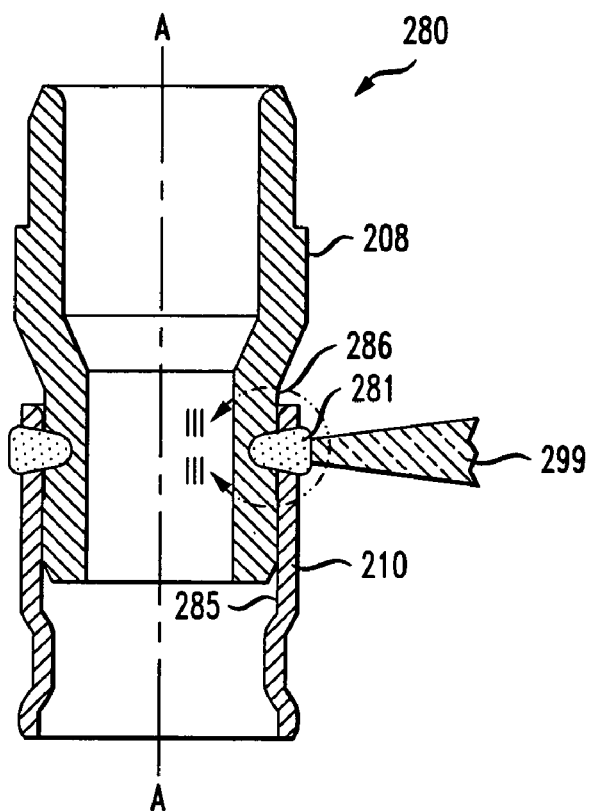
FIG. 2 is a sectional view of a pole piece and non-magnetic shell assembly according to one embodiment of the invention.

Referring now to FIG. 2, a pole piece assembly 280 includes the pole piece 208 and the non-magnetic shell 210. The pole piece 208 includes an external, outwardly facing annular surface 286. The non-magnetic shell 210 has an internal, inwardly-facing annular surface 285. The pole piece 208 and the non-magnetic shell 210 are initially assembled by pressing the two components together along the longitudinal axis A-A. The external annular surface 286 has a diameter slightly greater than the internal annular surface 285, resulting in a press fit or interference fit. The relative diameters are controlled closely to control the press force required to assemble the parts, to avoid galling and other damage to the parts. A lubricant such as oil may also be used to ameliorate those problems. In an exemplary embodiment, the nominal diameter of the external surface 286 of the pole piece 208 is 6.39 mm.

A weld bead 281 connects the pole piece 208 and non-magnetic shell to form the assembly. The weld bead 281 is annular; i.e., it extends in a ring-like manner around the joined components. The weld bead, as that term is used herein, is a mass of material originating from both components that are joined by the weld. The material has been liquefied by energy from a welding energy source such as a laser beam (shown schematically at 299). The materials from the joined components are comingled to some extent, although in most cases not completely. The liquefied material is allowed to cool back to the solid phase. In a completed assembly, the weld bead 281 is distinguishable from the parent parts because of its appearance, crystalline structure and other metallurgical characteristics.

The present invention addresses the problem of "blow-out" of the weld bead 281. It is believed that "blow-out" is caused by gases trapped in small voids or pockets between the surfaces 285, 286. For example, heated air or vaporized lubricant trapped in imperfections on the surfaces may cause a differential pressure across the molten weld bead 281.

Figure 3:
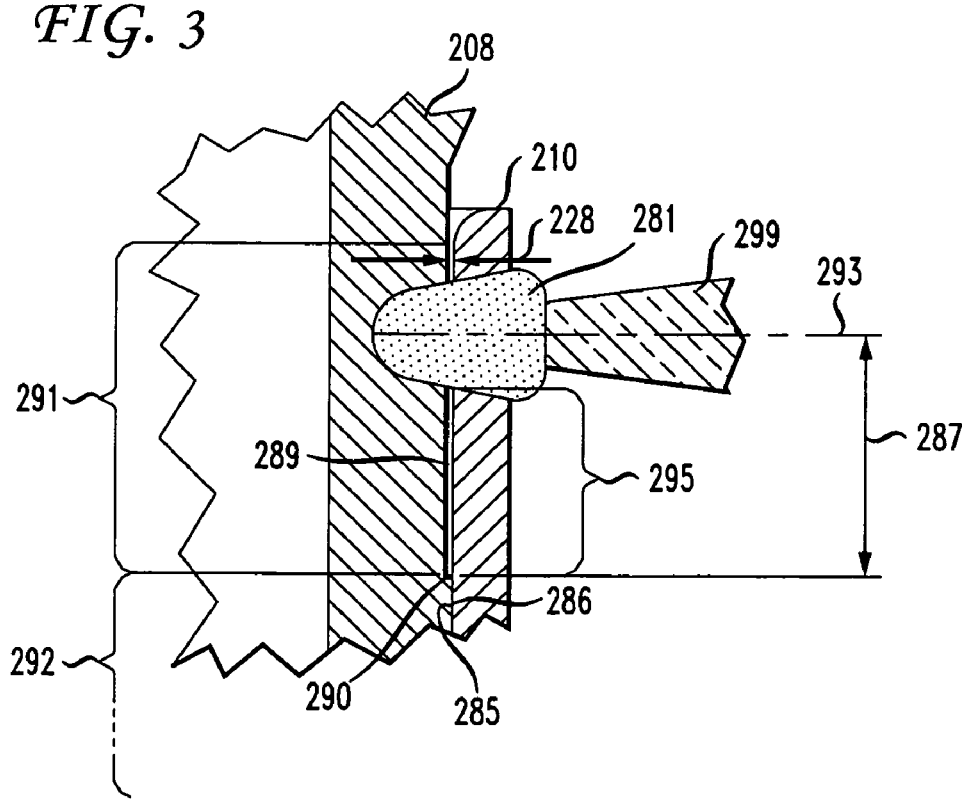
FIG. 3 is an enlargement of the region III-III of FIG. 2.

As best shown in FIG. 3, a small step 290 is formed in either component 208, 210. The step 290 may be formed in a machining operation such as a grinding or turning operation, or may be formed by a die in a press operation.

When the components 208, 210 are assembled and the surfaces 285, 286 are overlapped, an annular press-fit region 292 is created, wherein the two surfaces 285, 286 interfere, locking the parts together and creating a substantially airtight seal. A total length (not shown) of the press-fit region is preferably about 1.3 mm.

The step 290 results in a non-contact region 291 of the surfaces 285, 286. A gap 289 between the surfaces 285, 286 in the non-contact region has a preferred width 288 of between 0.005 and 0.025 mm.

The annular weld bead 281 formed by the laser beam 299 joins the external surface 286 with the internal surface 285 in the non-contact region 291. The weld bead 281 forms a hermetic seal preventing liquids and gases from passing between the components 208, 210. In a preferred embodiment, a nominal longitudinal distance 287 from a centerline 293 of the weld bead 281 to the press-fit region 292 is 1 mm. In other embodiments, the distance 287 may be from 0.5 mm to 5.0 mm.

The weld bead 281 and the press-fit region 292 demarcate a substantially sealed portion 295 of the gap 289. The sealed portion 295 is sufficiently large so that the vapors inside the sealed portion have sufficient time and volume to minimize the pressure differential across the weld bead 281 during the welding process. For example, the sealed region may be approximately 0.75 mm in length in a longitudinal direction. The sealed region may have a total volume of approximately 0.037 mm$^3$.

The inventors have found that a narrower gap is preferred (without becoming a press fit) for reducing "blow-out" at the weld overlap. For example, the sealed region may have a ratio of length to width of greater than 10. Preferably, the ratio is about 50. It has been theorized that as the gap width increases, vapor inside the sealed region has more exposed area to the molten weld pool. The larger exposed area to the weld pool leads to a more sudden increase in temperature, and consequently, vapor expansion and higher pressure. Conversely, a small gap minimizes the rate at which the pressure increases due to the small exposed area to the molten pool.

In general, the longer the longitudinal length of the sealed portion 295, the more resistant the design is to "blow-out" at the weld overlap. It has been theorized that the relatively cool facing walls of the two components 208, 210 cool the expanding gas, slowing the rate at which the internal pressure increases.

The press-fit region 292 provides an effective seal for preventing weld slag and oxides created during the welding operation from entering the valve body 206 (FIG. 1) and potentially contaminating the precision components contained there The press fit further is helpful in several processing steps of the fuel injector, such as handling the assembly 280 before welding.

FIG. 4 is a flow chart illustrating a method 400 according to one embodiment of the invention. The method is for forming a fuel injector having a fuel inlet, and fuel outlet and a fuel passageway extending from the fuel inlet to the fuel outlet along a longitudinal axis. The method includes the step of constructing (step 410) a first fuel injector component comprising a radially outwardly facing annular surface. The first fuel injector component may, for example, be a pole piece. A second fuel injector component is also constructed (step 420), comprising a radially inwardly facing annular surface. The second component may be a non-magnetic shell.

At least one of the annular surfaces is shaped (step 430) to form, when the surfaces are overlapped, a non-contact region having a gap between the surfaces, and a press-fit region where the first and second surfaces are in contact. The non-contact and press fit regions are adjacent. The shaping step 430 may be done in combination with forming steps 410, 420, or may be done as a subsequent operation.

The first and second components are assembled (step 450) with the annular surfaces overlapping. Assembly is performed by aligning the parts along their longitudinal axes, and pressing the parts together to a predetermined length. The parts are in contact in the press-fit region.

The annular surfaces are welded together (step 460) in the non-contact region to form an annular weld bead, the weld bead and the contact region bounding a substantially sealed portion of the gap. In a preferred embodiment, the welding operation is performed by rotating the assembled components about a longitudinal axis, and applying a stationary laser beam in the non-contact region of the overlapping surfaces. The laser is maintained "on" for slightly more than one revolution of the assembly, to form the weld overlap. In one exemplary embodiment, the assembly is rotated at 200 RPM. The laser is powered at 850 Watts for 285 milliseconds, then at 820 Watts for 45 milliseconds.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. For example, while the method is disclosed herein with respect to tubular components of a fuel injector, the techniques and configurations of the invention may be applied to other tubular components where a hermetic weld is required. It is to be understood that the embodiments shown and described herein are only illustrative of the principles of the present invention and that various modifications may be implemented by those skilled in the art without departing from the scope and spirit of the invention.

What is claimed is:

1. A method for forming a fuel injector having a fuel inlet, and fuel outlet and a fuel passageway extending from the fuel inlet to the fuel outlet along a longitudinal axis, the method comprising the steps of:
   constructing a first fuel injector component comprising a radially outwardly facing annular surface;
   constructing a second fuel injector component comprising a radially inwardly facing annular surface;
   shaping at least one of the annular surfaces to form, when the surfaces overlap, a non-contact region having a gap between the surfaces, and a press-fit region where the first and second surfaces are in contact, the non-contact and press fit regions being adjacent;
   assembling the first and second components by overlapping the annular surfaces; and
   welding the annular surfaces together in the non-contact region to form an annular weld bead, the weld bead and the press-fit region bounding a substantially sealed and remaining portion of the gap.

2. The method of claim 1, wherein the surfaces in the non-contact region are between 0.005 and 0.025 mm apart.

3. The method of claim 1, wherein a center of the weld bead is at least 1 mm from the contact region.

4. The method of claim 1, wherein the first fuel injector component is a pole piece and the second fuel injector component is a non-magnetic shell.

5. The method of claim 1, wherein the step of welding the annular surfaces together comprises laser welding.

6. The method of claim 5, wherein the step of laser welding further comprises the steps of:
   rotating the assembled first and second components about a longitudinal axis; and
   applying a laser welding beam.

7. The method of claim 6, wherein the step of laser welding further comprises the steps of:
   rotating the assembled first and second components at 200 RPM; and
   applying a laser welding beam for 285 milliseconds at 850 Watts, then applying the laser welding beam for 45 milliseconds at 820 Watts.

8. The method of claim 1, wherein the shaping step forms the non-contact region on a longitudinal side of the press-fit region opposite a valve body of the fuel injector.

9. A method for assembling a pole piece and a non-magnetic shell of a fuel injector, the pole piece comprising a radially outwardly facing annular surface and the non-magnetic shell comprising a radially inwardly facing annular surface, the method comprising the steps of:
   forming an annular relief region on at least one of the annular surfaces;
   assembling the non-magnetic shell and the pole piece with the annular surfaces overlapping; the first and second surfaces being in contact in a press-fit region, and the first and second surfaces defining a gap therebetween at the relief region;
   welding an annular weld bead in the relief region, the weld bead joining the annular surfaces, the weld bead and the press-fit region bounding a substantially sealed and remaining portion of the gap.

10. The method of claim 9, wherein the sealed portion of the gap has a volume of at least 0.037 mm$^3$.

11. The method of claim 9, wherein the surfaces in the gap are between 0.005 and 0.025 mm apart.

12. The method of claim 9, wherein a center of the weld bead is at least 1 mm from the press-fit region.

13. The method of claim 9, wherein the step of welding a weld bead comprises laser welding.

14. The method of claim 13, wherein the step of laser welding further comprises the steps of:
   rotating the assembled non-magnetic shell and pole piece about a longitudinal axis; and
   applying a laser welding beam.

15. The method of claim 14, wherein the step of laser welding further comprises the steps of:
   rotating the assembled non-magnetic shell and pole piece at 200 RPM; and
   applying a laser welding beam for 285 milliseconds at 850 Watts, then applying the laser welding beam for 45 milliseconds at 820 Watts.

* * * * *